May 3, 1955 R. T. CORNELIUS Re. 23,992

WABBLE PUMP

Original Filed May 7, 1953 2 Sheets-Sheet 1

INVENTOR.
RICHARD T. CORNELIUS
BY Caswell & Lagaard
ATTORNEYS

May 3, 1955 R. T. CORNELIUS Re. 23,992

WABBLE PUMP

Original Filed May 7, 1953 2 Sheets-Sheet 2

INVENTOR
RICHARD T CORNELIUS
BY Caswell & Lagaard
ATTORNEYS

United States Patent Office

Re. 23,992
Reissued May 3, 1955

23,992

WABBLE PUMP

Richard T. Cornelius, Minneapolis, Minn.

Original No. 2,693,764, dated November 9, 1954, Serial No. 353,583, May 7, 1953. Application for reissue January 4, 1955, Serial No. 479,877

14 Claims. (Cl. 103—133)

Matter enclosed in heavy brackets [ ] appears in the original patent but forms no part of this reissue specification; matter printed in italics indicates the additions made by reissue.

The herein disclosed invention relates to wabble pumps and has for an object to provide a construction in which the rotating parts are effectively sealed from the wabbler and pumping parts so as to prevent the entry of lubricant from the rotating parts to the chambers through which the fluid being pumped passes.

Another object of the invention resides in providing a construction in which the wabbler virtually floats with reference to the parts of the pump housing with which it is associated whereby a minimum resistance to the pumping action occurs and whereby greater efficiency results.

A further object of the invention resides in providing a flexible seal between the wabbler and the pump housing and in locating said seal in a manner such that a minimum amount of flexing of the seal occurs as the pump operates.

A still further object of the invention resides in providing the pump housing with an annular pump chamber formed with an outer spherical surface and the wabbler with a wabble plate movable in said chamber about the center of said spherical surface and in further disposing the flexible seal between the wabbler and the housing in a manner such that the medial plane of said chamber containing the center of said spherical surface extends through said seal.

Another object of the invention resides in constructing the wabbler with a head from which said wabble plate issues and in constructing said head with a pocket for the reception of said seal.

Other objects of the invention reside in the novel combination and arrangement of parts and in the details of construction hereinafter illustrated and/or described.

Figure 1:
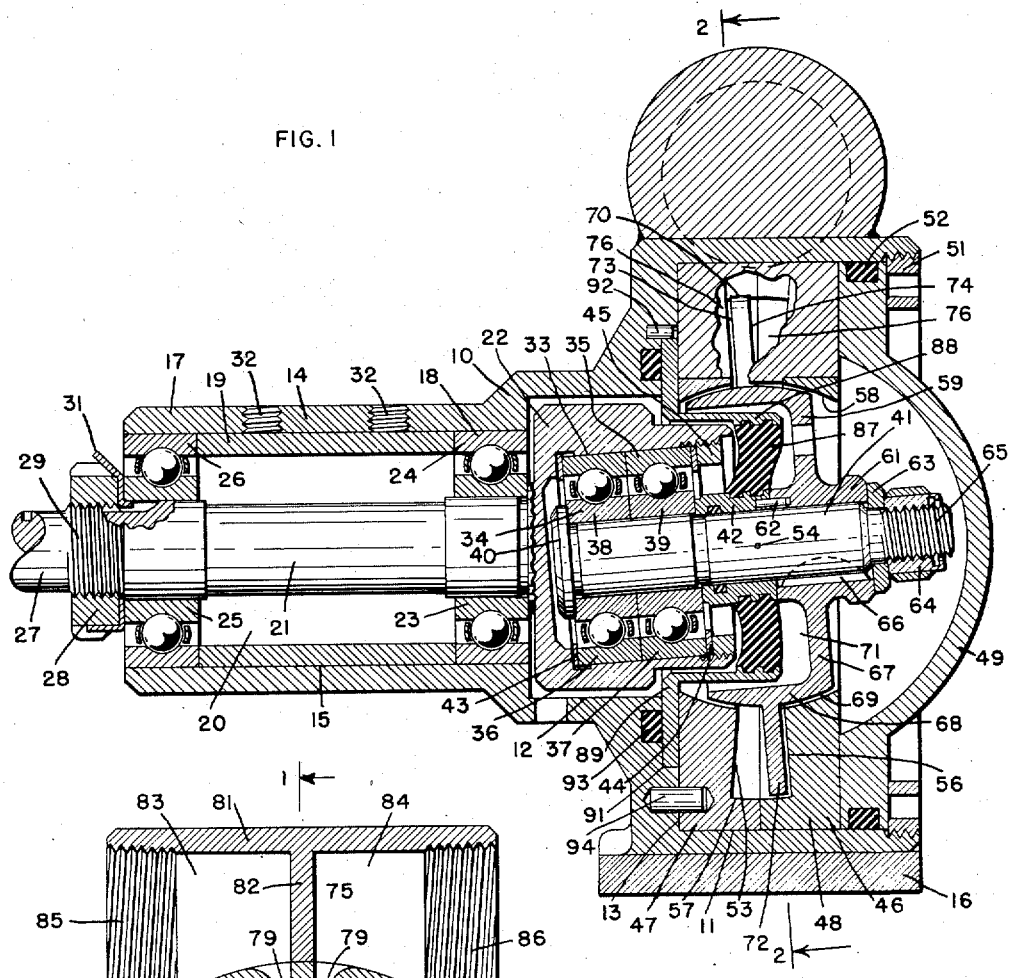
Fig. 1 is a longitudinal elevational sectional view taken on line 1—1 of Fig. 2.

The construction shown in the drawings consists of a housing supporting a drive shaft for rotation. This shaft carries a rotor having bearings therein and supporting a wabble shaft for rotation relative to said rotor. The wabble shaft has mounted on it a wabble head and from which a wabble plate issues. This wabble plate is movable in an annular chamber having two facing frustoconical surfaces and an outer end surface spherical in form. The medial plane of the wabble plate passes through the center of said spherical surface and likewise the medial plane of the chamber. The portion of the housing forming the annular chamber is constructed with an inner spherical surface concentric with said outer spherical surface and which intersects a slot in said chamber through which the wabble plate extends. A flexible seal attached to a part rotatable with the wabble plate and to a sleeve secured to the pump housing separates the rotating parts from the wabbler and thus prevents the passage of lubricant from the rotating parts to the fluid being pumped. This flexible seal is situated so that the medial plane of both the wabble plate and the pump chamber pass through the same. In one form of the invention the seal consists of a rubber disc secured to a sleeve mounted on the wabble shaft and to a sleeve secured to the housing. In the other form of the invention, the seal consists of a metallic bellows serving the same purpose and similarly mounted. The wabble head is of appreciable dimensions and is constructed with a flange and a tubular portion which has a spherical surface coacting with the inner spherical surface of the housing and closing the opening to the pump chamber. By means of this construction, a pocket is formed within the wabble head in which the seal is disposed. Suitable valve mechanisms formed within the pump and with the usual inlet and outlet passageways is also provided.

The invention consists of a housing 10 which is substantially cylindrical in form and which is constructed open at one end and with a bore 11 extending partly throughout the length of the same and communicating with the open end of the housing. Adjacent the bore 11 the said housing is formed with a second bore 12 of lesser diameter and providing between said bores a face 13. Disposed outwardly of the housing 10 is a tubular portion 14 which is constructed with a bore 15 smaller in diameter than the bore 12. The bores 11, 12 and 15 are all concentric. The housing 10 is provided with a base 16 by means of which the same may be attached to the surface on which the pump is to be mounted.

At the ends of the bore 15 of portion 14 of housing 10 are two ball bearings 17 and 18. The outer races 24 and 26 of these bearings are pressed into the bore 15 and are held in spaced relation by means of a sleeve 19 received within the bore 15 and engaging said races. A shaft 21 extending through the sleeve 19 is received in the inner races 23 and 25 of the bearings 18 and 17 and rotatably supported thereby. This shaft has a rotor 22 on one end of the same and which is freely received within the bore 12 of the housing. This rotor bears against the inner race 23 of the bearing 18. The other end of the shaft 21 has a shaft extension 27 which extends outwardly beyond the tubular portion 14 of housing 10 and through which power may be applied to the said shaft to drive the pump. A nut 28 screwed on threads 29 formed on this shaft extension engages a lock washer 31 disposed between said nut and the inner face 25 of the bearings 17. By means of this construction the two bearings are urged toward each other and the outer races 24 and 26 thereof held in engagement with the sleeve 19. Set screws 32 screwed into the portion 14 of housing 10 hold the sleeve 19 from movement and correspondingly the bearings 17 and 18 in position.

The rotor 22 has a bore 33 therein which is angularly disposed with reference to the axis of the shaft 21. This bore receives the outer races 34 and 35 of two ball bearings 36 and 37. The inner races 38 and 39 of these bearings support a shaft 41 which will be referred to as the wabble shaft. The shaft 41 has a head 40 at one end of the same which engages the inner race 38 of bearing 36. A sleeve 42 mounted on shaft 41 engages the outer end of the race 39 of bearing 37 and is urged against such bearing in a manner to be presently described to hold the shaft rigidly mounted in said bearings. The outer race 34 of the bearing 36 engages a washer 43 at the end of the bore 33. A similar washer 44 is disposed adjacent the outer race 35 of bearing 36 and is engaged by a retaining ring 45 screwed into the rotor 22. By means of this construction the shaft 42 and the bearings 36 and 37 are held from endwise movement relative to the rotor 22. However, the shaft 41 is free to rotate relative to said rotor.

Lubrication of the parts is procured by means of a lubricant placed within the interior 20 of sleeve 19 and within the bore 12 of housing 10. Such lubrication readily reaches the various bearings 17, 18, 36 and 37.

Within the bore 11 of housing 10 is a case 46 consisting of two inserts 47 and 48. The insert 47 fits against the face 13 of the housing 10 while the insert 48 butts up against the insert 47. The case 46 is held from rotation within the housing 10 by means of a dowel pin 94 extending between said case and housing. A cap 49 also received within the bore 11 is urged into engagement with the insert 48 by means of a retaining ring 51 screwed into the end of the housing 10. A fluid-tight connection between the said cap and housing is procured through a gasket 52 interposed between said cap and the housing. The insert 47 is constructed with a frusto-conical surface 53, the apex of which lies along the axis of the shaft 21. The insert 48 similarly has a frusto-conical surface 56, the apex of which likewise lies along the axis of the shaft 21. The surfaces 53 and 56 are disposed in spaced diverging relation and are connected at their bases by means of a spherical surface 57 which has its center 54 disposed along the axis of the shaft 21 at a locality midway between the apexes of the two surfaces 53 and 56. The case 46 further has a spherical surface 58 whose center similarly coincides with the center 54. The axis of the shaft 21 also contains the center 54. This center will hereafter be referred to as the wabble center of the pump.

Mounted on the wabble shaft 41 is a wabble head 59 which is constructed with a hub 61 disposed on said shaft. The said hub engages the sleeve 42 and is keyed thereto by means of a pin 62. A washer 63 encircles the end of the shaft 41 and bears against the hub 61. A nut 64 screwed on threads 65 formed on the end of the shaft 41 urges the washer 63 against hub 61 and cooperating with the head 42 on shaft 41 clamps the races 38 and 39 of bearings 36 and 37, the sleeve 42 and the hub 61 securely in position upon said shaft. The hub 61 is held from rotation by means of a key 66 entering both said shaft and hub. Issuing outwardly from the hub 61 is a web 67 which has connected to the outer end of the same a tubular member 68. This tubular member has a spherical surface 69 conforming to the surface 58 of the case 46 and whose center coincides with the center 54. The said web and tubular member provide a pocket 71 within the wabble head 59 and which serves a purpose to be presently described in detail. Issuing outwardly from the tubular member 68 is an annular disc like plate 72 which will be referred to as the wabble plate. This plate has two surfaces 73 and 74 which are at right angles to the axis of the shaft 41 and which are equally spaced from the wabble center 54. The surface 73 is adapted to lie in close proximity to the surface 53 of case 46 while the surface 74 is adapted to lie in close proximity to the surface 56 of said case. In addition, the end 70 of plate 72 conforms to and lies in close proximity to the spherical surface 57 of case 46. In the drawings the various surfaces of the wabble head 59 have been shown in an exaggerated manner as spaced from the corresponding surfaces of the case 46. The pump will however be constructed with small clearances, and when so constructed functions in an extremely efficient manner to pump liquids such as water and the like which afford a seal between the parts. If, however, it becomes desirable, the surfaces can be constructed as contacting with the result that higher pressures can be procured at the expense of greater friction between the parts.

*While the surfaces 53 and 56 have been shown as frustoconical and the surfaces 73 as plane, it will be readily comprehended that the surfaces 53 and 56 may be generated by various lines rotated about the axis of the drive shaft and the surfaces 73 by lines lying in proximity to elements of surfaces 53 and 54 and rotated about the axis of the wabble shaft.*

At the upper end of the case 46, the same is provided with a partition 75 which is received in slots 76 in the inserts 47 and 48. This partition extends through a notch 77 in the wabble plate 72 and down to the spherical surface 69 of the tubular member 68 of the wabble head 59. The inner end 78 of this partition has a surface corresponding with the surface 58 of case 46 and which surface is held spaced from the surface 69 of the wabble head 59 by means of shoulders 79 formed on the said partition and engaging corresponding shoulders on the inserts 47 and 48. Overlying the housing 10 at the locality of the partition 75 is a tubular portion 81 which is brazed or welded to said housing. This portion has a partition 82 in the same which overlies and engages the partition 75 and which divides the interior of said portion into two chambers 83 and 84. One of these chambers serves as an outlet chamber and the other [h]as an inlet chamber. Threads 85 and 86 in said portion of the housing permit of connection of suitable pipes or tubes to the pump.

Disposed between the shaft 41 and the housing 10 is a flexible annular seal 87. This annular seal is in the form of a relatively heavy disc of rubber or other similar material and has its inner edge integrally connected to the sleeve 42 and its outer edge integrally connected to a sleeve 88 formed on a flange 89. Seal 87 is so situated that the center of the medial plane thereof lies substantially at the wabble center 54. Flange 89 is received in an annular recess 91 formed in the face 13 of the housing 10. A dowel pin 92 holds the flange 89 from rotation. The insert 48 is held from rotation relative to the insert 47 by means of the partitions 75. A gasket 93 disposed between the housing 10 and the flange 89 prevents leakage between the seal 87 and the housing.

Figure 2:
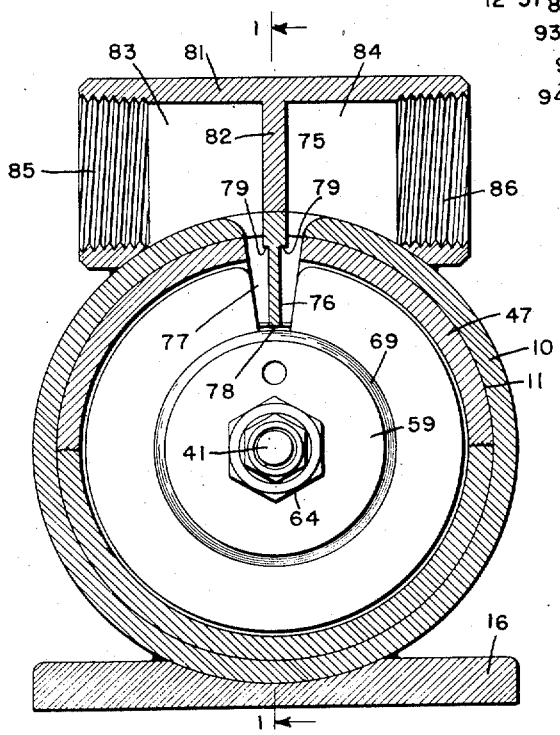
Fig. 2 is a transverse elevational sectional view taken on line 2—2 of Fig. 1.
Figure 3:
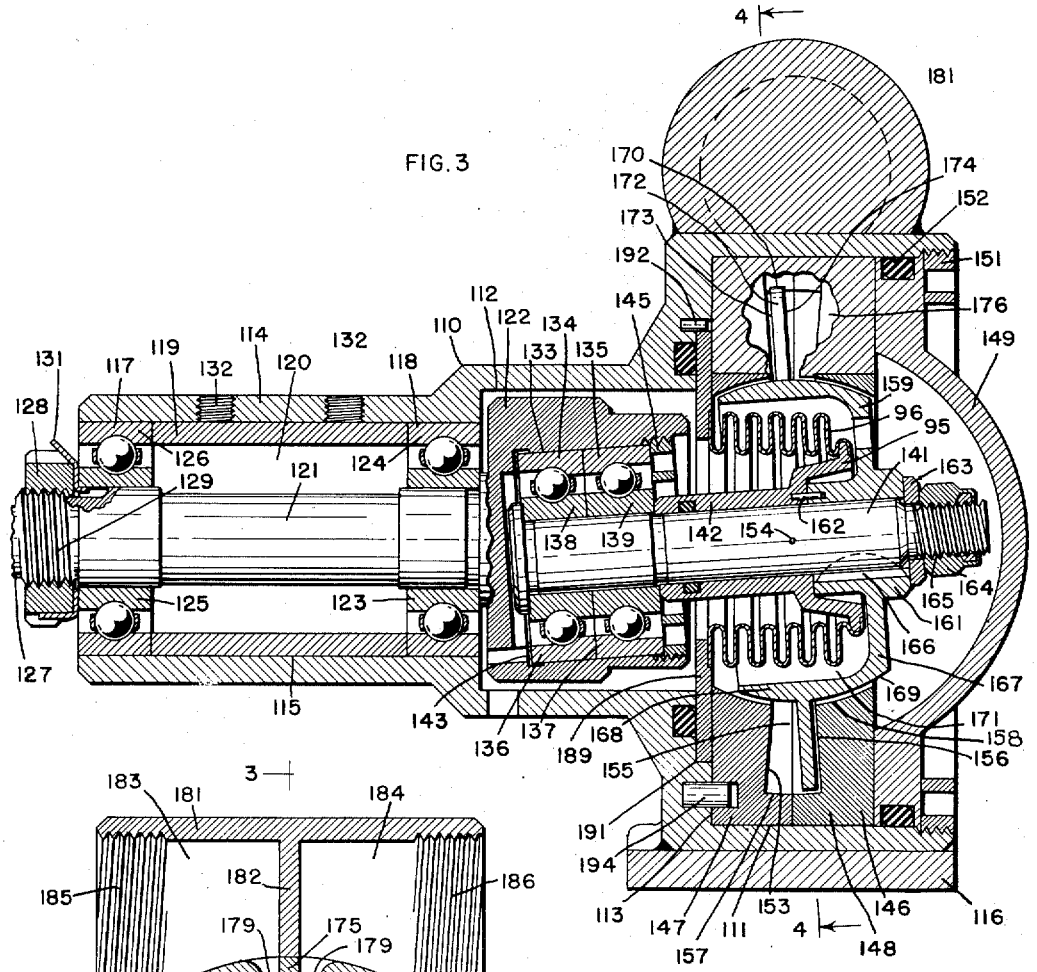
Fig. 3 is a view similar to Fig. 1 of a modification of the invention and taken on line 3—3 of Fig. 4.
Figure 4:
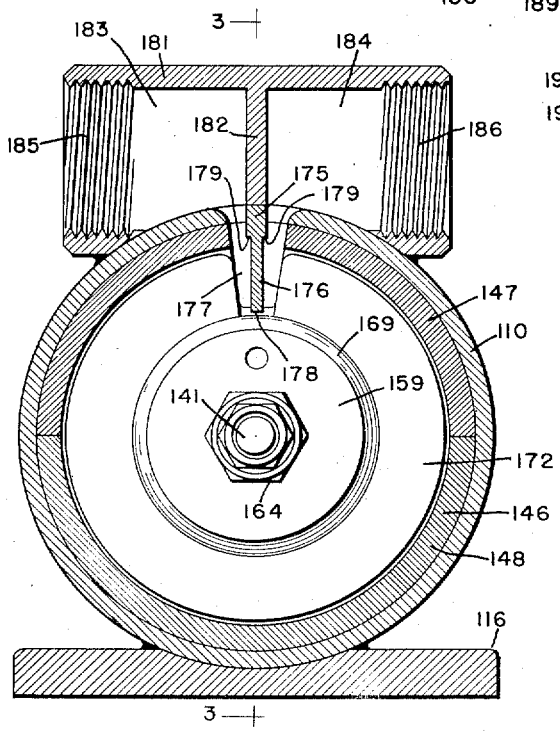
Fig. 4 is a view similar to Fig. 2 of the construction shown in Fig. 3 and taken on line 4—4 of Fig. 3.

The form of the invention shown in Figs. 3 and 4 is similar to that shown in Figs. 1 and 2 and the description of the similar parts will not be repeated but will be referred to by the same reference characters preceded by the digit "1."

In the construction shown in Figs. 3 and 4 the sleeve 142 is constructed with an end bell 95 to which one end of a flexible metal bellows 94 is attached. In this form of the invention, the flexible member 87 is dispensed with and the bellows 96 takes its place. The flange 189 is constructed without the sleeve 88 and the other end of the bellows 96 secured thereto. The remainder of the pump is the same as that previously described and its operation is identical excepting that the bellows 96 flexes as the plate 72 wabbles instead of the seal 87.

The method of the operation of the invention is obvious. As the shaft 21 rotates rotor 22 rotates and shaft 41 nutates with it. The bearings 36 and 37 being angularly disposed cause the shaft 41 to wabble and the plate 72 to follow along the surfaces 53 and 56 of the insert 47. This causes the fluid to be drawn in through one of the chambers 83 and 84 and to be discharged through the other. While the wabbler is in action the seal 87 is being distorted to accommodate the movement thereof or the bellows 96 is similarly being distorted to accommodate the movement of the plate 172. The lubrication contained within the interior 20 of the housing 10 and within the bore 12 of said housing is maintained within said portions of the housing and prevented from entering the portion of the housing in which the fluid being pumped passes. In this manner the fluid is prevented from being contaminated by the lubricating medium and the rotating parts are maintained well lubricated.

The advantages of the invention are manifest. Thoroughly lubricated bearings and rotating parts can be employed so that friction in the operation of the pump may be held to a minimum. The wabbler virtually floats being supported by the seal, and with suitable tolerances between the cooperating surfaces frictional contact therewith can be eliminated to further reduce the friction of the pump. Where water or similar fluids are being pumped, the fluid pumped serves as a seal between the cooperating surfaces and direct contact becomes unnecessary. The pump can be operated at a relatively high speed as from an electric motor and will have a relatively great displacement for its size. By the particular location of the seal employed, the lubrication for the bearings is separated from the chambers through which the fluid pumped passes and contamination of the fluid pumped is thus prevented. The location of the seal in the manner specified reduces the distortion of the seal during operation so that the seal will have a relatively long life.

Changes in the specific form of the invention, as herein described, may be made within the scope of what is claimed without departing from the spirit of the invention.

Having described the invention, what is claimed as new and desired to be protected by Letters Patent is:

1. In a wabble pump, a housing, means carried thereby and forming an annular chamber having facing frusto-conical surfaces arranged in diverging relation and an outer spherical surface extending therebetween, said chamber having an inner annular opening, a disc like wabble plate disposed within said chamber and extending through said opening, one side of said wabble plate lying in close proximity to one of said conical surfaces, the other side of said wabble plate lying in close proximity to the other of said conical surfaces and the edge of said wabble plate lying in close proximity to said spherical surface, a drive shaft rotatably mounted in said housing and having its axis passing through the center of said spherical surface, and at right angles to a medial plane of said chamber equally spaced from said frusto-conical surfaces at the intersections thereof with said spherical surface and containing said center, a rotor mounted on said shaft, a wabble shaft rotatably mounted in said rotor and attached to said wabble plate, the axis of said wabble shaft being at right angles to said wabble plate and passing through the center of said spherical surface, an annular flexible seal extending between said housing and wabble shaft and having a part fixed relative to said housing and a part fixed relative to said wabble shaft, the medial plane of said chamber passing through said seal.

[2. In a wabble pump, a housing, means carried thereby and forming an annular chamber having facing frusto-conical surfaces arranged in diverging relation and an outer spherical surface extending therebetween, said chamber having an inner annular opening, a disc like wabble plate disposed within said chamber and extending through said opening, one side of said wabble plate lying in close proximity to one of said conical surfaces, the other side of said wabble plate lying in close proximity to the other of said conical surfaces and the edge of said wabble plate lying in close proximity to said spherical surface, a drive shaft rotatably mounted in said housing and having its axis passing through the center of said spherical surface, and at right angles to a medial plane of said chamber equally spaced from said frusto-conical surfaces at the intersections thereof with said spherical surface and containing said center, a rotor mounted on said shaft, a wabble shaft rotatably mounted in said rotor and attached to said wabble plate, the axis of said wabble shaft being at right angles to said wabble plate and passing through the center of said spherical surface, a sleeve on said wabble plate and fixedly secured thereto, a second sleeve encircling said first sleeve and fixedly secured to said housing and a flexible seal secured to both of said sleeves and having parts fixed relative to both said housing and wabble shaft, the medial plane of said chamber passing through said seal.]

[3. In a wabble pump, a housing, means carried thereby and forming an annular chamber having facing frusto-conical surfaces arranged in diverging relation and an outer spherical surface extending therebetween, said chamber having an inner annular opening, said means having an inner spherical surface intersecting said opening and concentric with said outer spherical surface, a disc like wabble plate disposed within said chamber and extending through said opening, one side of said wabble plate lying in close proximity to one of said conical surfaces, the other side of said wabble plate lying in close proximity to the other of said conical surfaces and the edge of said wabble plate lying in close proximity to said outer spherical surface, a drive shaft rotatably mounted in said housing and having its axis passing through the center of said spherical surfaces, and at right angles to a medial plane of said chamber equally spaced from said frusto-conical surfaces at the intersections thereof with said spherical surface and containing said center, a rotor mounted on said shaft, a wabble shaft rotatably mounted in said rotor, a head mounted on said wabble shaft, said wabble plate issuing from and being supported by said head, said head having a spherical surface lying in close proximity to said inner spherical surface, the axis of said wabble shaft being at right angles to said wabble plate and passing through the center of said spherical surfaces, said head having a pocket within the same and an annular flexible seal extending between said housing and said wabble shaft and having a part fixed relative to said housing and a part fixed relative to said wabble shaft, said seal being disposed within said pocket.]

[4. In a wabble pump, a housing, means carried thereby and forming an annular chamber having facing frusto-conical surfaces arranged in diverging relation and an outer spherical surface extending therebetween, said chamber having an inner annular opening, said means having an inner spherical surface intersecting said opening and concentric with said outer spherical surface, a disc like wabble plate disposed within said chamber and extending through said opening, one side of said wabble plate lying in close proximity to one of said conical surfaces, the other side of said wabble plate lying in close proximity to the other of said conical surfaces and the edge of said wabble plate lying in close proximity to said outer spherical surface, a drive shaft rotatably mounted in said housing and having its axis passing through the center of said spherical surfaces, and at right angles to a medial plane of said chamber equally spaced from said frusto-conical surfaces at the intersections thereof with said spherical surface and containing said center, a rotor mounted on said shaft, a wabble shaft rotatably mounted in said rotor, a head mounted on said wabble shaft, said wabble plate issuing from and being supported by said head, said head having a spherical surface lying in close proximity to said inner spherical surface, the axis of said wabble shaft being at right angles to said wabble plate and passing through the center of said spherical surface, said head having a pocket within the same and an annular flexible seal extending between said housing and wabble shaft and having a part fixed relative to said housing and a part fixed relative to said wabble shaft, said seal being disposed within said pocket, the medial plane of said chamber passing through said seal.]

[5. In a wabble pump, a housing, means carried thereby and forming an annular chamber having facing frusto-conical surfaces arranged in diverging relation and an outer spherical surface extending therebetween, said chamber having an inner annular opening, said means having an inner spherical surface intersecting said opening and concentric with said outer spherical surface, a disc like wabble plate disposed within said chamber and extending through said opening, one side of said wabble plate lying in close proximity to one of said conical surfaces, the other side of said wabble plate lying in close proximity to the other of said conical surfaces and the edge of said wabble plate lying in close proximity to said outer spherical surface, a drive shaft rotatably mounted in said housing and having its axis passing through the center of said spherical surfaces, and at right angles to a medial plane of said chamber equally spaced from said frusto-conical surfaces at the intersections thereof with said spherical surface and containing said center, a rotor mounted on said shaft, a wabble shaft rotatably mounted in said rotor, a head mounted on said wabble shaft, said wabble plate issuing from and being supported by said head, said head being formed with a web and a tubular member issuing therefrom to form a pocket within said head, said tubular member having a spherical surface lying in close proximity to said inner spherical surface, and an annular flexible seal extending between said housing and wabble shaft and having a part fixed relative to said housing and a part fixed relative to said wabble shaft, said seal being disposed within said pocket.]

6. In a wabble pump, a housing, means carried thereby and forming an annular chamber having facing frusto-conical surfaces arranged in diverging relation and an outer spherical surface extending therebetween, said chamber having an inner annular opening, a disc like wabble plate disposed within said chamber and extending through said opening, one side of said wabble plate lying in close proximity to one of said conical surfaces, the other side of said wabble plate lying in close proximity to the other of said conical surfaces and the edge of said wabble plate lying in close proximity to said outer spherical surface, a drive shaft rotatably mounted in said housing and having its axis passing through the center of said spherical surface, and at right angles to a medial plane of said chamber equally spaced from said frusto-conical surfaces at the intersections thereof with said spherical surface and containing said center, a rotor mounted on said shaft, a wabble shaft rotatably mounted in said rotor and attached to said wabble plate, the axis of said wabble shaft being at right angles to said wabble plate and passing through the center of said spherical surfaces, an annular flexible seal extending between said housing and wabble shaft and having a part fixed relative to said housing and a part fixed relative to said wabble shaft, the medial plane of said wabble plate passing through said seal.

[7. In a wabble pump, a housing, means carried thereby and forming an annular chamber having facing frusto-conical surfaces arranged in diverging relation and an outer spherical surface extending therebetween, said chamber having an inner annular opening, a disc like wabble plate disposed within said chamber and extending through said opening, one side of said wabble plate lying in close proximity to one of said conical surfaces, the other side of said wabble plate lying in close proximity to the other of said conical surfaces and the edge of said wabble plate lying in close proximity to said outer spherical surface, a drive shaft rotatably mounted in said housing and having its axis passing through the center of said spherical surface, and at right angles to a medial plane of said chamber equally spaced from said frusto-conical surfaces at the intersections thereof with said spherical surface and containing said center, a rotor mounted on said shaft, a wabble shaft rotatably mounted in said rotor and attached to said wabble plate, the axis of said wabble shaft being at right angles to said wabble plate and passing through the center of said spherical surface, an annular flexible seal extending between said housing and wabble shaft and having a part fixed relative to said housing and a part fixed relative to said wabble shaft, a plane passing through the center of said outer spherical surface and at right angles to the axis of said drive shaft passing through said seal.]

[8. In a wabble pump, a housing, means carried thereby and forming an annular chamber having facing frusto-conical surfaces arranged in diverging relation and an outer spherical surface extending therebetween, said chamber having an inner annular opening, a disc like wabble plate disposed within said chamber and extending through said opening, one side of said wabble plate lying in close proximity to one of said conical surfaces, the other side of said wabble plate lying in close proximity to the other of said conical surfaces and the edge of said wabble plate lying in close proximity to said spherical surface, a drive shaft rotatably mounted in said housing and having its axis passing through the center of said spherical surface, and at right angles to a medial plane of said chamber equally spaced from said frusto-conical surfaces at the intersections thereof with said spherical surface and containing said center, a rotor mounted on said shaft, a wabble shaft rotatably mounted in said rotor and attached to said wabble plate, the axis of said wabble shaft being at right angles to said wabble plate and passing through the center of said spherical surface, an annular flexible seal extending between said housing and wabble shaft and having a part fixed relative to said housing and a part fixed relative to said wabble shaft, said flexible seal being disposed substantially at said center.]

[9. In a wabble pump, a housing, means carried thereby and forming an annular chamber having facing frusto-conical surfaces arranged in diverging relation and an outer spherical surface extending therebetween, said chamber having an inner annular opening, a disc like wabble plate disposed within said chamber and extending through said opening, one side of said wabble plate lying in close proximity to one of said conical surfaces, and spaced therefrom, the other side of said wabble plate lying in close proximity to the other of said conical surfaces and spaced therefrom and the edge of said wabble plate lying in close proximity to said spherical surface and spaced therefrom, a drive shaft rotatably mounted in said housing and having at its axis passing through the center of said spherical surface, and at right angles to a medial plane of said chamber equally spaced from said frusto-conical surfaces at the intersections thereof with said spherical surface and containing said center, a rotor mounted on said shaft, a wabble shaft rotatably mounted in said rotor and attached to said wabble plate, the axis of said wabble shaft being at right angles to said wabble plate and passing through the center of said spherical surface, an annular flexible seal extending between said housing and wabble shaft and having a part fixed relative to said housing and a part fixed relative to said wabble shaft said flexible seal being disposed substantially at said center.]

[10. In a wabble pump, a housing, means carried thereby and forming an annular chamber having facing frusto-conical surfaces arranged in diverging relation and an outer spherical surface extending therebetween, said chamber having an inner annular opening, said means having an inner spherical surface intersecting said opening and concentric with said outer spherical surface, a disc like wabble plate disposed within said chamber and extending through said opening, one side of said wabble plate lying in close proximity to one of said conical surfaces, the other side of said wabble plate lying in close proximity to the other of said conical surfaces and the edge of said wabble plate lying in close proximity to said outer spherical surface, a drive shaft rotatably mounted in said housing and having its axis passing through the center of said spherical surfaces, and at right angles to a medial plane of said chamber equally spaced from said frusto-conical surfaces at the intersections thereof with said spherical surface and containing said center, a rotor mounted on said shaft, a wabble shaft rotatably mounted in said rotor, a head mounted on said wabble shaft, said wabble plate issuing from and being supported by said head, said head having a spherical surface lying in close proximity to said inner spherical surfaces, the axis of said wabble shaft being at right angles to said wabble plate and passing through the center of said spherical surface, said head having a pocket within the same open axially on one side of said head and an annular flexible seal extending between said housing and said wabble shaft and having a part fixed relative to said housing and a part fixed relative to said wabble shaft, said seal being disposed within said pocket and being insertable therein through the open end thereof.]

[11. In a wabble pump, a housing, means carried thereby and forming an annular chamber having facing frusto-conical surfaces arranged in diverging relation and an outer spherical surface extending therebetween, said chamber having an inner annular opening, said means having an inner spherical surface intersecting said opening and concentric with said outer spherical surface, a disc like wabble plate disposed within said chamber and extending through said opening, one side of said wabble plate lying in close proximity to one of said conical surfaces, the other side of said wabble plate lying in close proximity to the other of said conical surfaces and the edge of said wabble plate lying in close proximity to said outer spherical surface, a drive shaft rotatably mounted in said housing and having its axis passing through the center of said spherical surfaces, and at right angles to a medial plane of said chamber equally spaced from said frusto-conical surfaces at the intersections thereof with said spherical surface and containing said center, a rotor mounted on said shaft, a wabble shaft rotatably mounted in said rotor, a head mounted on said wabble shaft, said wabble plate issuing from and being supported by said head, said head having a spherical surface lying in close proximity to said inner spherical surface, the axis of said wabble shaft being at right angles to said wabble plate and passing through the center of said spherical surfaces, said head having a pocket within the same open axially on the side of said head facing said rotor, a sleeve carried by said housing and fixed relative thereto, said sleeve entering said pocket through the open end thereof, an annular flexible seal encircling said wabble shaft and received within said pocket, a sleeve encircling said wabble shaft and fixed relative thereto said seal at its outer periphery being secured to said first named sleeve and at its inner periphery to said second named sleeve.]

[12. In a wabble pump, a housing, means carried thereby and forming an annular chamber having facing frusto-conical surfaces arranged in diverging relation and an outer spherical surface extending therebetween, said chamber having an inner annular opening, said means having an inner spherical surface intersecting said opening and concentric with said outer spherical surface, a disc like wabble plate disposed within said chamber and extending through said opening, one side of said wabble plate lying in close proximity to one of said conical surfaces, the other side of said wabble plate lying in close proximity to the other of said conical surfaces and the edge of said wabble plate lying in close proximity to said outer spherical surface, a drive shaft rotatably mounted in said housing and having its axis passing through the center of said spherical surfaces, and at right angles to a medial plane of said chamber equally spaced from said frusto-conical surfaces at the intersections thereof with said spherical surface and containing said center, a rotor mounted on said shaft, a wabble shaft rotatably mounted in said rotor, a head mounted on said wabble shaft, said wabble plate issuing from and being supported by said head, said head having a spherical surface lying in close proximity to said inner spherical surface, the axis of said wabble shaft being at right angles to said wabble plate and passing through the center of said spherical surfaces, said head having a pocket within the same open axially on the side of said head facing said rotor, annular means carried by said housing and entering said pocket through the open end thereof, an annular flexible seal encircling said wabble shaft and received within said pocket, said seal at its outer periphery being fixed relative to said annular means and at its inner periphery being fixed relative to said wabble shaft.]

13. In a wabble pump, a housing means carried thereby and forming an annular chamber having facing frusto-conical surfaces arranged in diverging relation and an outer spherical surface extending therebetween, said chamber having an inner annular opening, said means having an inner spherical surface intersecting said opening and concentric with said outer spherical surface, a disc like wabble plate disposed within said chamber and extending through said opening, one side of said wabble plate lying in close proximity to one of said conical surfaces, the other side of said wabble plate lying in close proximity to the other of said conical surfaces and the edge of said wabble plate lying in close proximity to said outer spherical surface, a drive shaft rotatably mounted in said housing and having its axis passing through the center of said spherical surfaces, and at right angles to a medial plane of said chamber equally spaced from said frusto-conical surfaces at the intersections thereof with said spherical surface and containing said center, a rotor mounted on said shaft, a wabble shaft rotatably mounted in said rotor, a head mounted on said wabble shaft, said wabble plate issing from and being supported by said head, said head having a spherical surface lying in close proximity to said inner spherical surface, the axis of said wabble shaft being at right angles to said wabble plate and passing through the center of said spherical surfaces, said head having a pocket within the same open axially on the side of said head facing said rotor, a sleeve carried by said housing and fixed relative thereto, said sleeve entering said pocket through the open end thereof, an annular flexible seal encircling said wabble shaft and received within said pocket, a sleeve encircling said wabble shaft and fixed relative thereto, said seal at its outer periphery being secured to said first named sleeve and at its inner periphery to said second named sleeve, the medial plane of said chamber passing through said seal.

*14. In a wabble pump, a housing, a drive shaft rotatably mounted in said housing, a rotor mounted on said shaft, a wabble shaft mounted in said rotor for relative rotation therebetween and having its axis forming an angle with and intersecting the axis of said drive shaft, means carried by said housing and providing an annular chamber having spaced surfaces facing each other and formed by lines rotated about the axis of the drive shaft and an outer spherical surface extending therebetween with its center disposed at the intersection between said axes, said chamber having an inner annular opening, a wabble plate carried by said shaft and extending through said opening and into said chamber, said wabble plate having spaced surfaces formed by lines conforming to and disposed in close proximity to elements of said first named facing surfaces and rotated about the axis of said wabble shaft, a sleeve on said wabble plate and fixedly secured thereto, a second sleeve encircling said first sleeve and fixedly secured to said housing, and a flexible seal secured to both of said sleeves and having parts fixed relative to both said housing and wabble shaft, said seal being disposed substantially at said center.*

*15. In a wabble pump, a housing, a drive shaft rotatably mounted in said housing, a rotor mounted on said shaft, a wabble shaft mounted in said rotor for relative rotation therebetween and having its axis forming an angle with and intersecting the axis of said drive shaft, means carried by said housing and providing an annular chamber having spaced surfaces facing each other and formed by lines rotated about the axis of the drive shaft, an outer spherical surface extending therebetween with its center disposed at the intersection between said axes, said chamber having an inner annular opening, a wabble head mounted on said wabble shaft, a wabble plate issuing from and being supported by said head, and extending through said opening and into said chamber, said wabble plate having spaced surfaces formed by lines conforming to and disposed in close proximity to elements of said first named facing surface and rotated about the axis of said wabble shaft, said head having a pocket within the same, and an annular flexible seal extending between said housing and wabble shaft, and having a part fixed relative to said housing and a part fixed relative to said wabble shaft, said seal being disposed within said pocket.*

*16. In a wabble pump, a housing, a drive shaft rotatably mounted in said housing, a rotor mounted on said shaft, a wabble shaft mounted in said rotor for relative rotation therebetween and having its axis forming an angle with and intersecting the axis of said drive shaft, means carried by said housing and providing an annular chamber having spaced surfaces facing each other and formed by lines rotated about the axis of the drive shaft, an outer spherical surface extending therebetween with its center disposed at the intersection between said axes, said chamber having an inner annular opening, a wabble head mounted on said wabble shaft, a wabble plate issuing from and being supported by said head and extending through said opening and into said chamber, said wabble plate having spaced surfaces formed by lines conforming to and disposed in close proximity to elements of said first named facing surfaces and rotated about the axis of said wabble shaft, said head having a pocket within the same, and an annular flexible seal extending between said housing and wabble shaft and having a part fixed relative to said housing and a part fixed relative to said wabble shaft, said seal being disposed within said pocket, said seal being disposed substantially at said center.*

*17. In a wabble pump, a housing, a drive shaft rotatably mounted in said housing, a rotor mounted on said shaft, a wabble shaft mounted in said rotor for relative rotation therebetween and having its axis forming an angle with and intersecting the axis of said drive shaft, means carried by said housing and providing an annular chamber having spaced surfaces facing each other and formed by lines rotated about the axis of the drive shaft and an outer spherical surface extending therebetween with its center disposed at the intersection between said axes, said chamber having an inner annular opening, a wabble head mounted on said wabble shaft and secured thereto, a wabble plate issuing outwardly from said head and extending through said opening and into said chamber, said wabble plate having spaced surfaces formed by lines conforming to and disposed in close proximity to elements of said first named facing surfaces and rotated about the axis of said wabble shaft, said head having a pocket, a sleeve fixed relative to said housing, and an annular flexible seal disposed in said pocket and extending between said housing and wabble shaft and having a part fixed relative to said sleeve and a part fixed relative to said wabble shaft.*

*18. In a wabble pump, a housing, a drive shaft rotatably mounted in said housing, a rotor mounted on said shaft, a wabble shaft mounted in said rotor for relative rotation therebetween and having its axis forming an angle with and intersecting the axis of said drive shaft, means carried by said housing and providing an annular chamber having spaced surfaces facing each other and formed by lines rotated about the axis of the drive shaft, an outer spherical surface extending therebetween with its center disposed at the intersection between said axes, said chamber having an inner annular opening, a wabble head including a hub mounted on said wabble shaft and secured thereto, a web issuing outwardly from said hub, a tubular member issuing outwardly from said web and forming with said web a pocket in said head, a wabble plate issuing from said tubular member and extending through said opening and into said chamber, said wabble plate having spaced surfaces formed by lines conforming to and in close proximity to elements of said first named facing surfaces and rotated about the axis of said wabble shaft, a sleeve fixed relative to said housing, and extending into said pocket, and an annular flexible seal disposed in said pocket, extending between said sleeve and wabble shaft and having a part fixed relative to said sleeve and a part fixed relative to said wabble shaft.*

*19. In a wabble pump, a housing, a drive shaft rotatably mounted in said housing, a rotor mounted on said shaft, a wabble shaft mounted in said rotor for relative rotation therebetween and having its axis forming an angle with and intersecting the axis of said drive shaft, means carried by said housing and providing an annular chamber having spaced surfaces facing each other and formed by lines rotated about the axis of the drive shaft and an outer spherical surface extending therebetween with its center disposed at the intersection between said axes, said chamber having an inner annular opening, a wabble plate carried by said wabble shaft and extending through said opening and into said chamber, said wabble plate having spaced surfaces formed by lines conforming to and disposed in close proximity to elements of said first named facing surfaces and rotated about the axis of said wabble shaft, and an annular flexible seal extending between said housing and wabble shaft and having a part fixed relative to said housing and a part fixed relative to said wabble shaft, a plane passing through said center and disposed at right angles to the axis of said drive shaft passing substantially through said seal.*

*20. In a wabble pump, a housing, a drive shaft rotatably mounted in said housing, a rotor mounted on said shaft, a wabble shaft mounted in said rotor for relative rotation therebetween and having its axis forming an angle with and intersecting the axis of said drive shaft, means carried by said housing and providing an annular chamber having spaced surfaces facing each other and formed by lines rotated about the axis of the drive shaft and an outer spherical surface extending therebetween with its center disposed at the intersection between said axes, said chamber having an inner annular opening, a wabble plate carried by said wabble shaft and extending through said opening and into said chamber, said wabble plate having spaced surfaces formed by lines conforming to and disposed in close proximity to elements of said first named facing surfaces and rotated about the axis of said wabble shaft, and an annular flexible seal extending between said housing and wabble shaft and having a part fixed relative to said housing and a part fixed relative to said wabble shaft, said flexible seal being disposed substantially at said center.*

*21. In a wabble pump, a housing, a drive shaft rotatably mounted in said housing, a rotor mounted on said shaft, a wabble shaft mounted in said rotor for relative rotation therebetween and having its axis forming an angle with and intersecting the axis of said drive shaft, means carried by said housing and providing an annular chamber having spaced surfaces facing each other and formed by lines rotated about the axis of the drive shaft and an outer spherical surface extending therebetween with its center disposed at the intersection between said axes, said chamber having an inner annular opening, a wabble plate carried by said wabble shaft and extending through said opening and into said chamber, said wabble plate having spaced surfaces formed by lines conforming to and disposed in close proximity to elements of said first named facing surfaces and rotated about the axis of said wabble shaft, the surfaces of said wabble plate being spaced from the surfaces of the housing forming said chamber, and an annular flexible seal extending between said housing and wabble shaft and having a part fixed relative to said housing and a part fixed relative to said wabble shaft, said flexible seal being disposed substantially at said center.*

*22. In a wabble pump, a housing, a drive shaft rotatably mounted in said housing, a rotor mounted on said shaft, a wabble shaft mounted in said rotor for relative rotation therebetween and having its axis forming an angle with and intersecting the axis of said drive shaft, means carried by said housing and providing an annular chamber having spaced surfaces facing each other and formed by lines rotated about the axis of the drive shaft and an outer spherical surface extending therebetween with its center disposed at the intersection between said axes, said chamber having an inner annular opening, a wabble head mounted on said wabble shaft and secured thereto, a wabble plate issuing outwardly from said head*

*and extending through said opening and into said chamber, said wabble plate having spaced surfaces formed by lines conforming to and disposed in close proximity to elements of said first named facing surfaces and rotated about the axis of said wabble shaft, said head having a pocket open axially on one side of said head, and an annular flexible seal extending between said housing and said wabble shaft and having a part fixed relative to said housing and a part fixed relative to said wabble shaft, said seal being disposed within said pocket and being insertable therein through the open end thereof.*

*23. In a wabble pump, a housing, a drive shaft rotatably mounted in said housing, a rotor mounted on said shaft, a wabble shaft mounted in said rotor for relative rotation therebetween and having its axis forming an angle with and intersecting the axis of said drive shaft, means carried by said housing and providing an annular chamber having spaced surfaces facing each other and formed by lines rotated about the axis of the drive shaft and an outer spherical surface extending therebetween with its center disposed at the intersection between said axes, said chamber having an inner annular opening, a wabble head mounted on said wabble shaft and secured thereto, a wabble plate issuing outwardly from said head and extending through said opening and into said chamber, said wabble plate having spaced surfaces formed by lines conforming to and disposed in close proximity to elements of said first named facing surfaces and rotated about the axis of said wabble shaft, said head having a pocket open axially on the side of said head facing said rotor, a sleeve carried by said housing and fixed relative thereto, said sleeve entering said pocket through the open end thereof, an annular flexible seal encircling said wabble shaft and received within said pocket, a sleeve encircling said wabble shaft and fixed relative thereto, said seal at its outer periphery being secured to said first named sleeve and at its inner periphery to said second named sleeve.*

*24. In a wabble pump, a housing, a drive shaft rotatably mounted in said housing, a rotor mounted on said shaft, a wabble shaft mounted in said rotor for relative rotation therebetween and having its axis forming an angle with an intersecting the axis of said drive shaft, means carried by said housing and providing an annular chamber having spaced surfaces facing each other and formed by lines rotated about the axis of the drive shaft and an outer spherical surface extending therebetween with its center disposed at the intersection between said axes, said chamber having an inner annular opening, a wabble head mounted on said wabble shaft and secured thereto, a wabble plate issuing outwardly from said head and extending through said opening and into said chamber, said wabble plate having spaced surfaces formed by lines conforming to and disposed in close proximity to elements of said first named facing surfaces and rotated about the axis of said wabble shaft, said head having a pocket open axially on one side of said head, annular means carried by said housing and entering said pocket through the open end thereof, an annular flexible seal encircling said wabble shaft and received within said pocket, said seal at its outer periphery being fixed relative to said annular means and at its inner periphery being fixed relative to said wabble shaft.*

References Cited in the file of this patent or the original patent

UNITED STATES PATENTS

| | | |
|---|---|---|
| 1,434,741 | Goodner | Nov. 7, 1922 |
| 2,065,834 | Swennes | Dec. 29, 1936 |
| 2,107,090 | Swennes | Feb. 1, 1938 |
| 2,253,306 | Probst | Aug. 19, 1941 |

FOREIGN PATENTS

| | | |
|---|---|---|
| 37,077 | Sweden | June 25, 1914 |
| 105,461 | Sweden | July 9, 1942 |